United States Patent Office 3,277,091
Patented Oct. 4, 1966

3,277,091
PROCESS FOR THE PRODUCTION OF s-TRIAZINES
Hans-Georg Schmelzer, Gerhard Dankert, Eberhart Degener, and Hans Holtschmidt, Leverkusen, Germany, assignors to Farbenfabriken Bayer Aktiengesellschaft, Leverkusen, Germany, a corporation of Germany
No Drawing. Filed Oct. 14, 1964, Ser. No. 403,921
Claims priority, application Germany, Oct. 26, 1963,
F 41,116
5 Claims. (Cl. 260—248)

This invention relates to a process for the production of substituted s-triazines by reacting an amidine with a 1,3-disubstituted trichloro-2-azapropene.

The production of unsymmetrically substituted s-triazines by the mixed trimerisation of different compounds containing nitrile groups is known. However, this reaction generally leads to the production of mixtures of substances, the separation of which is difficult.

It has now been found that unitary, substituted s-triazines of the general Formula III are obtained if amidines of the general Formula I are reacted with 1,3-disubstituted trichloro-2-azapropenes of the general Formula II in a liquid medium and optionally in the presence of a base at temperatures from —20 to +200° C.

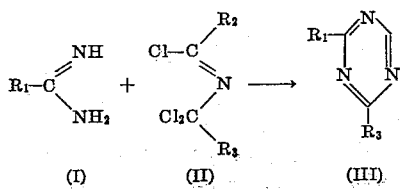

In the formulae, $R_1$ represents an alkyl, aryl, cycloalkyl or aralkyl radical, a hydrocarbon radical containing one or more olefinic double bonds or treble bonds, a heterocyclic radical or hydrogen, and ether group, e.g. —$OR_4$, a thioether group, e.g. —$SR_4$, or an amino group such as —$NH_2$, —$NHR_4$, —$NR_4R_5$, —NH—N=$CHR_4$, —NH—C≡N or —N=$CHR_4$ wherein $R_4$ and $R_5$ represent alkyl, aryl, cycloalkyl, aralkyl radicals, hydrocarbon radicals containing one or more olefinic double bonds or treble bonds or heterocyclic radicals. The radicals $R_4$ and $R_5$ and the radicals mentioned under $R_1$ which correspond to those mentioned under $R_4$ or $R_5$ may optionally be substituted once or several times. To be considered as substituents, are the radicals mentioned under $R_4$ and $R_5$, halogens, nitro, ester, carbonamide, sulphonamide, hydroxyl, nitrile, ether and thioether groups and (with the aforementioned meaning for $R_4$), azo groups of the form —N=N—$R_4$, urea groups of the form

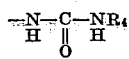

urethane groups of the form

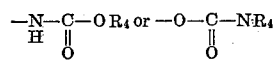

and amino groups substituted twice with the radicals mentioned under $R_4$ $R_2$ and $R_3$ represent perchlorinated alkyl, perchlorinated alkenyl, perchlorinated cycloalkyl, perchlorinated aralkyl, aryl radicals and possibly aryl radicals substituted once or several times by chlorine or trifluoromethyl groups, and also the radical

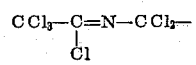

The process provided by the invention takes place with surprising smoothness at low temperatures and supplies the substituted s-triazines, generally with good yields and sometimes immediately with excellent purity. Many of the reactions claimed proceed particularly satisfactorily in aqueous solution or suspension and even in the presence of aqueous alkali. This fact is all the more surprising, since the 1,3-disubstituted trichloroazapropenes are very sensitive to hydrolysis.

The following are mentioned as examples of compounds with an amidine structure (I): Benzamidine, 2-, 3- and 4-chlorobenzamidines, o-, m- and p-toluylic acid amidines, 2-, 3- and 4-methoxybenzamidines, 2-, 3- and 4-nitrobenzamidines, phenylacetamidine, acetamidine, trichloracetamidine, propionamidine, β - hydroxypropionamidine, β-chloropropionamidine, formamidine, 2-, 3- and 4-pyridine carbamidine, 1- and 2-naphthamidine, cyclohexyl carbamidine, cyclopentyl carbamidine, 3-cyclohexenyl carbamidine, linoleic acid amidine, linolenic acid amidine, phenylpropiolic acid amidine, stearic acid amidine, or the mineral acid or carboxylic acid salts of the said amidines, such as their hydrochlorides or acetates, guanidine, phenylguanidine, 4-chlorophenyl guanidine, benzaliminoguanidine, dicyandiamide, or the mineral acid or carboxylic acid salts of the said guanidines, for example their hydrochlorides, carbonates or acetates, pseudourea methyl ethers, pseudothiourea methyl ethers, pseudothiourea benzyl ether or compounds such isothiuronium salts of mineral acids or carboxylic acids, such as the chlorides, sulphates and acetates.

Suitable 1,3 - disubstituted trichloro - 2 - azapropenes, which in some cases have been prepared by our own earlier processes by chlorination of carboxylic acid imide chlorides or their hydrochlorides at temperatures between 10 and 220° C. and optionally with exposure to ultraviolet light and in some cases by processes known from the literature (Angew. Chemie 74, 848 (1962)), are for example N-perchlorethyl trichloracetimide chloride,
1-phenyl-1,3,3-trichloro-3-trichlormethyl-2-azapropene-(1),
1-phenyl-1,1,3-trichloro-3-trichloromethyl-2-azapropene-(2),
1-(4'-chlorophenyl)-1,1,3-trichloro-3-trichloromethyl-2-azapropene-(2),
1-(2'-chlorophenyl)-1,1,3-trichloro-3-trichloromethyl-2-azapropene-(2),
1-(3',4'-dichlorophenyl)-1,1,3-trichloro-3-trichloromethyl-2-azapropene-(2),
1-(trichlorovinyl)-1,3,3-trichloro-3-trichloromethyl-2-azapropene-(1)

and the compound of the Formula IV

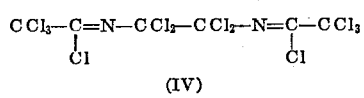

(IV)

According to the invention, the reactions are carried out by adding the 1,3-disubstituted trichloro-2-azapropenes, as such or in the presence of a liquid medium, e.g. in an inert solvent, to a liquid medium, e.g. a solution or suspension, of the amidines or their salts and optionally containing a base at temperatures from −20 to +200° C., advantageously from 0 to 100° C., optionally with external cooling. The reactions generally take place exothermally. In some cases, it is advisable to continue heating for a short time after completing the addition of the reaction mixture. In many cases, it is expedient to effect the addition of the reactants in the reverse sequence.

To be considered as inert solvents for the 1,3-disubstituted trichloro-2-azapropenes are for example ethers such as diethylether, dioxane and tetrahydrofuran, ketones such as acetone and methylethyl ketone, aliphatic hydrocarbons and their mixtures, such as cyclohexane and petroleum ether fractions, chlorinated aliphatic hydrocarbons such as methylene chloride, chloroform, carbon tetrachloride, trichlorethylene and perchlorethylene and aromatic hydrocarbons such as benzene and toluene. Suitable as solvents for the amidines or their salts are water, alcohols such as methanol, ethanol, isopropanol and glycolmonomethyl ether, esters such as ethyl acetate and glycol monomethylether acetate, as well as the aforementioned solvents for the 1,3-disubstituted trichloro-2-azapropenes, as well as dimethyl formamide, dimethyl sulphoxide, dimethyl sulphone, and solvent mixtures of the said solvents such as acetone/water, ethanol/water and two-phase systems such as ether/water and benzene/water.

For neutralising the acid formed in the reaction, it is advantageous to add at least the calculated quantity of a base. As bases, it is possible for example to use caustic soda or caustic potash solution, aqueous ammonia solution, gaseous ammonia, sodium carbonate, potassium carbonate, sodium acetate, tertiary amines such as pyridine, triethylamine, N,N-dimethyl cyclohexylamine, N,N-dimethylaniline, sodium and potassium methylate and also potassium tert.-butylate. When using free amidine bases, the base can also be replaced by an excess of amidine.

Depending on the solvent used in the reaction, the substituted s-triazine precipitated during the reaction in crystalline form can be obtained after completion of the reaction by precipitation with water or by concentrating the solvent by evaporation.

The substituted s-triazines obtainable by the process of invention are effective nematicides, for example the second and sixth compounds noted in the table below show in the contact test an 80% nematicidal activity against meloidogyne spec. on lettuce plants at concentration of 50 p.p.m.. (mixed with soils).

*Example 1*

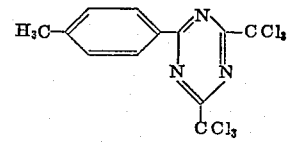

1.7 g. of p-tolamidine hydrochloride (0.01 mol.) are suspended in a solution of 3.8 g. of N-perchlorethyl trichloracetamide chloride (0.01 mol.) in 50 ml. of acetone. While stirring and cooling externally, a solution of 1.6 g. of sodium hydroxide (0.04 mol.) in 10 ml. of water is added dropwise at 5 to 10° C. to the suspension within approximately 5 minutes. The reaction mixture is thereafter heated for 15 minutes under reflux and then the cooled solution is diluted with 120 ml. of water. The crystalline precipitate is suction-filtered, washed with water and crystallised from ethyl alcohol.

Colourless needles, M.P. 123° C. Yield: 84%.
$C_{12}H_7Cl_6H_3$ (405).
Calculated: C, 35.55; H, 1.73; Cl, 52.4; N, 10.37. Found: C, 35.44; H, 1.92; Cl, 51.85; N, 10.52.

*Example 2*

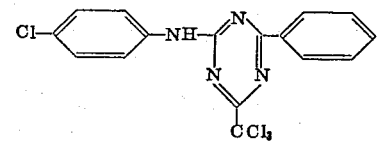

The solution of 3.39 g. of 1-phenyl-1,1,3-trichloro-3-trichloromethyl-2-azapropene-(2) (0.01 mol.) in 30 ml. of dioxane is added to the suspension of 1.7 g. of p-chloro phenyl guanidine (0.01 mol.) in 20 ml. of dioxane. Whilst stirring and cooling externally, a solution of 1.2 g. of sodium hydroxide (0.03 mol.) in 8 ml. of water is added dropwise to 0 to 10° C. to the suspension within about 5 minutes. Stirring is continued for 10 minutes at room temperature and then for 30 minutes in a boiling water bath. 300 ml. of water are then added, whereupon a light yellow semi-crystalline mass separates out, which crystallises through completely after stirring for some time and is then suction-filtered. After recrystallisation from dilute ethanol, the light yellow prisms melt at 169° C.

Yield: 3.4 g. (85%).
$C_{16}H_{10}Cl_4N_4$ (400).
Calculated: C, 48.00, H, 2.50; Cl, 35.50; N, 14.00. Found: C, 47.98; H, 2.71; Cl, 34.75; N, 14.08.

Other substituted s-triazines produced by the process according to the invention are set out in the following table.

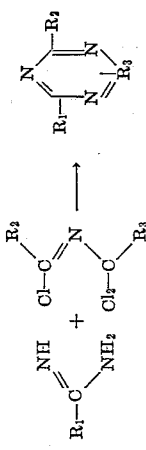

| $R_1$ | $R_2$ | $R_3$ | M.P., °C. | B.P., °C. | Formula | Yield, Percent | Carbon, Percent Calc. | Carbon, Percent Found | Hydrogen Calc. | Hydrogen Found | Nitrogen Calc. | Nitrogen Found | Chlorine Calc. | Chlorine Found | Production Process |
|---|---|---|---|---|---|---|---|---|---|---|---|---|---|---|---|
| phenyl | —CCl₃ | —CCl₃ | | 160°/0.25 mm | C₁₁H₈Cl₆N₃ | 76 | 33.50 | 33.01 | 2.03 | 2.44 | 10.68 | 10.75 | 53.80 | 53.30 | 1 |
| Cl-phenyl | —CCl₃ | —CCl₃ | 158 | | C₁₁H₄Cl₇N₃ | 73 | 31.05 | 31.20 | 0.94 | 1.18 | 9.89 | 9.97 | 58.20 | 57.25 | 1 |
| CH₃O-phenyl | —CCl₃ | —CCl₃ | 144 | | C₁₂H₇Cl₆N₃O | 83.5 | 34.20 | 34.33 | 1.66 | 1.84 | 9.99 | 9.86 | 50.40 | 50.05 | 1 |
| phenyl-CH₂- | —CCl₃ | —CCl₃ | 44 | 165°/0.3 mm | C₁₂H₇Cl₆N₃ | 92.3 | 35.55 | 35.02 | 1.73 | 1.78 | 10.37 | 10.52 | 52.40 | 52.70 | 1 |
| CH₃-CH₂- | —CCl₃ | —CCl₃ | 36 | 112°/0.3 mm | C₇H₅Cl₆N₃ | 73 | 24.50 | 24.50 | 1.46 | 1.64 | 12.25 | 12.17 | 61.90 | 61.80 | 1 |
| NO₂-phenyl | —CCl₃ | —CCl₃ | 103 | | C₁₁H₄Cl₆N₄O₂ | 94 | 30.30 | 30.49 | 0.92 | 0.89 | 12.85 | 12.76 | 48.65 | 48.20 | 1 |
| pyridyl | —CCl₃ | —CCl₃ | 114.5 | | C₁₀H₄Cl₆N₄ | 64 | 30.60 | 30.72 | 1.02 | 1.25 | 14.30 | 14.22 | 54.20 | 53.40 | 1 |
| H— | —CCl₃ | —CCl₃ | 39.5 | 102°/0.25 mm | C₅HCl₆N₃ | 51 | 19.05 | 19.08 | | | 13.35 | 13.63 | 67.30 | 67.30 | 1 |
| Cl-phenyl-NH— | —CCl₃ | —CCl₃ | 139 | | C₁₁H₅Cl₇N₄ | 95.2 | 29.99 | 30.61 | 1.13 | 1.29 | 12.70 | 12.81 | 58.70 | 57.80 | 1 |
| CH₃-S-phenyl | —CCl₃ | —CCl₃ | 69 | | C₆H₃Cl₆N₃S | 83.2 | 19.95 | 19.93 | 0.83 | 1.17 | 11.65 | 11.73 | 29.10 | 28.90 | 1 |
| CH₃-phenyl | —CCl₃ | phenyl | 122 | | C₁₇H₁₂Cl₆N₃ | 93.5 | 56.10 | 56.31 | 3.29 | 3.43 | 11.55 | 11.71 | 36.90 | 36.50 | 2 |
| Cl-phenyl | —CCl₃ | phenyl | 134 | | C₁₆H₉Cl₄N₃ | 91 | 49.90 | 49.33 | 2.34 | 2.62 | 10.90 | 10.83 | | | 2 |
| NO₂-phenyl | —CCl₃ | phenyl | 160 | | C₁₆H₉Cl₃N₄O₂ | 91.2 | 48.60 | 48.41 | 2.28 | 2.38 | 14.20 | 14.28 | 26.90 | 26.95 | 2 |
| CH₃O-phenyl | —CCl₃ | phenyl | 120 | | C₁₇H₁₂N₃Cl₃O | 97.4 | 53.70 | 53.85 | 3.16 | 3.57 | 11.05 | 11.00 | 27.90 | 27.85 | 2 |

Production process: 1 = Carried out acc. to Example 1. 2 = Carried out acc. to Example 2.

What we claim is:
1. A process for the production of substituted s-triazines which comprises reacting an amidine of the formula

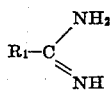

with a 1,3-disubstituted trichloro-2-azapropene of the formula

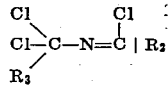

wherein $R_1$ represents a member of the group consisting of hydrogen, an alkyl group, an aryl group, a cycloalkyl group, an aralkyl group, a pyridyl group, an ether group, a thioether group, an amino group, an unsaturated hydrocarbon radical and $R_2$ and $R_3$ represent a member of the group consisting of a perchlorinated alkyl, a perchlorinated alkenyl, a perchlorinated cycloalkyl, a perchlorinated aralkyl, an aryl radical, a chloroaryl radical, a trifluoromethyl-aryl radical and the radical of the formula

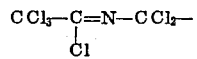

said reacting being carried out in a liquid medium at temperatures from about $-20$ to about $+200°$ C.

2. A process according to claim 1, wherein said liquid medium is acetone.

3. A process according to claim 1, wherein said liquid medium is dioxane.

4. A process for the production of substituted s-triazines which comprises reacting an amidine of the formula

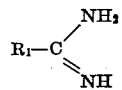

with a 1,3-disubstituted trichloro-2-azapropene of the formula

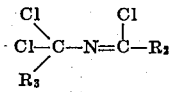

wherein $R_1$ represents a member of the group consisting of hydrogen, an alkyl group, an aryl group, a cycloalkyl group, an aralkyl group, a pyridyl group, an ether group, a thioether group, an amino group, an unsaturated hydrocarbon radical and $R_2$ and $R_3$ represent a member of the group consisting of a perchlorinated alkyl, a perchlorinated alkenyl, a perchlorinated cycloalkyl, a perchlorinated aralkyl, an aryl radical, a chloroaryl radical, a trifluoromethyl-aryl radical and the radical of the formula

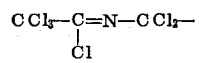

said reacting being carried out in a liquid medium in the presence of a base at temperatures from about $-20$ to about $+200°$ C.

5. A process according to claim 4, wherein said base is sodium hydroxide.

References Cited by the Examiner
UNITED STATES PATENTS 2,876,221   3/1959   Schroeder et al. _____ 260—248

WALTER A. MODANCE, *Primary Examiner.*

JOHN M. FORD, *Assistant Examiner.*

UNITED STATES PATENT OFFICE
CERTIFICATE OF CORRECTION

Patent No. 3,277,091                October 4, 1966

Hans-Georg Schmelzer et al.

It is hereby certified that error appears in the above numbered patent requiring correction and that the said Letters Patent should read as corrected below.

Column 1, lines 26 to 34, the Formula III for that portion of the formula reading

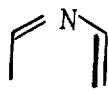        read        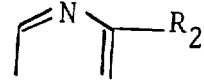

line 38, for "and" read -- an --; column 3, line 56, for "ethanol" read -- methanol --; line 62, for "solution" read -- solutions --; columns 5 and 6, in Table under the heading "Formula" sixth column, line 11 thereof, for "$C_{17}H_{12}C_{63}N_3$" read -- $C_{17}H_{12}Cl_3N_3$ --; column 7, lines 11 to 16, for that portion of the formula reading:

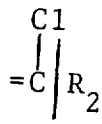        read        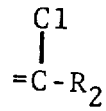

Signed and sealed this 29th day of August 1967.

(SEAL)
Attest:

ERNEST W. SWIDER
Attesting Officer

EDWARD J. BRENNER
                               Commissioner of Patents